(12) United States Patent
Johnston

(10) Patent No.: US 6,345,845 B2
(45) Date of Patent: *Feb. 12, 2002

(54) PHASE CONTROLLED SEQUENTIAL GRIPPING TUBE FITTING

(75) Inventor: Lonnie E. Johnston, Aurora, OH (US)

(73) Assignee: Swagelok Company, Solon, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,590

(22) Filed: Aug. 21, 1998

Related U.S. Application Data

(63) Continuation-in-part of application No. 08/787,967, filed on Jan. 23, 1997, now abandoned.

(51) Int. Cl.[7] .................................................. F16L 19/08
(52) U.S. Cl. ...................... 285/382.7; 285/384; 285/342
(58) Field of Search .............................. 285/382.7, 342, 285/384

(56) References Cited

U.S. PATENT DOCUMENTS

| 2,377,891 A | 6/1945 | Laue |
| 3,075,793 A | 1/1963 | Lennon et al. |
| 3,103,373 A | 9/1963 | Lennon et al. |
| 3,215,457 A | 11/1965 | Teeters |
| 3,433,508 A | 3/1969 | Teeters |
| 3,445,128 A | 5/1969 | Teeters |
| 3,584,900 A | 6/1971 | Lennon et al. |
| 3,695,640 A | * 10/1972 | Clague |
| 3,736,008 A | 5/1973 | Crawford |
| 4,826,218 A | * 5/1989 | Zahuranec ................. 285/342 |
| 4,915,427 A | 4/1990 | Zahuranec |
| 5,669,637 A | * 9/1997 | Chitty et al. |

FOREIGN PATENT DOCUMENTS

| BE | 795528 | 6/1973 | |
| DE | 004041679 A | * 6/1992 | .............. 285/282.7 |
| EP | 000489289 A | * 4/1992 | .............. 285/382.7 |
| FR | 1256108 | 2/1960 | |
| GB | 1233372 | 8/1967 | |
| GB | 1233371 | * 5/1971 | |

* cited by examiner

Primary Examiner—Anthony Knight
Assistant Examiner—Vishal Patel
(74) Attorney, Agent, or Firm—Calfee, Halter & Griswold, LLP

(57) ABSTRACT

A phase controlled sequential gripping tube fitting for gripping a tube therein, the fitting comprising a rear ferrule shaped to receive the tube therein, the rear ferrule having a nose portion and a central body. The tube fitting further comprises a front ferrule having an axially-extending rear portion radially outwardly spaced from the rear ferrule, whereby when the rear ferrule is urged axially in a first direction the rear ferrule grips the tube, and whereby the rear portion of the front ferrule reduces buckling of the rear ferrule.

9 Claims, 2 Drawing Sheets

PHASE CONTROLLED SEQUENTIAL GRIPPING TUBE FITTING

This application is a continuation-in-part of U.S. Ser. No. 08/787,967, filed Jan. 23, 1997 now abandoned.

BACKGROUND OF THE INVENTION

The subject invention is directed toward the art of tube fittings and, more particularly, to an improved phase controlled, sequential gripping tube fitting.

The general form of tube fitting with which this invention is concerned is described and claimed in the following series of U.S. patents which are incorporated herein by reference:

U.S. Pat. No. 2,484,815 issued Oct. 18, 1949
U.S. Pat. No. 3,075,793 issued Jun. 29, 1963
U.S. Pat. No. 3,103,373 issued Sep. 10, 1963
U.S. Pat. No. 4,826,218 issued May 2, 1989
U.S. Pat. No. 4,915,427 issued Apr. 10, 1990

U.S. Pat. No. 4,915,427 discloses and claims a phase controlled, sequential gripping tube fitting particularly suitable for use on heavy walled tubes. The arrangement disclosed in the patent obtains proper pull-up action in a two ferrule fitting for heavy walled tubes by using ferrules having a relatively heavy and substantial construction including heavily flanged rear end portions. In addition, the coupling nut portion surrounding the ferrules is arranged to closely enclose the flanged rear end portions of the ferrules.

While the described arrangement works very satisfactorily, it would be more desirable to obtain equivalent functioning with lighter weight ferrules without relying on the heavy rear flange design.

SUMMARY OF THE INVENTION

The subject invention provides an arrangement which overcomes the above-discussed disadvantage of the prior design and allows relatively light weight ferrules to perform satisfactorily with heavy walled tubing by controlling and containing the ferrule swaging action in a manner which prevents undesirable ferrule deformation. The design prevents excessive "bear claw" deformation of the rear ferrule and assures that the rear ferrule transmits the necessary driving forces to the front ferrule prior to full engagement of the rear ferrule with the tube.

In accordance with a preferred form of the invention, a phase controlled, sequential gripping tube fitting including a main body having a cylindrical tube end receiving opening with a tapered camming mouth forming the entry to the opening has a front ferrule with a tapered forward nose surface in engagement in the camming mouth and a rear surface with a conically tapered recess that extends forwardly toward the nose surface. A rear ferrule having a conically tapered nose is positioned so that the tapered nose extends into the conically tapered recess of the front ferrule. The rear ferrule further includes a rear force engaging surface. Threadedly connected to the main body is a coupling nut engaged with the rear force receiving surface of the rear ferrule to drive the rear ferrule axially forward into the conically tapered rear surface of the front ferrule and produce radial inward movement of the nose portion of the rear ferrule as well as radial inward movement of the nose portion of the front ferrule. The assembly includes an improved arrangement to control outward buckling of the rear ferrule. The arrangement includes a cylindrical central body on the rear ferrule with the central body located between the nose portion and the rear force receiving surface. Associated with the central body is a cylindrical flange portion formed on the front ferrule and extending axially rearwardly therefrom at a location radially outward of the rear recess of the front ferrule. The cylindrical flange has a cylindrical interior surface that closely surrounds the cylindrical central body of the rear ferrule to limit radial outward movement of the rear ferrule or portions thereof.

The arrangement between the nose and central body of the rear ferrule and its relationship to the axially rearward extending cylindrical flange on the front ferrule results in containment of the rear ferrule and anchors it against toroidal torsion which can produce the "bear claw" deformation. In addition, it is believed that by moving the contact and force transmission point forwardly into the body of the front ferrule, the front ferrule is driven move smoothly and with less radial deformation. This result can be further enhanced by closely containing the rear portion of the front ferrule by providing the coupling nut with an interior cylindrical surface which substantially engages and closely contains the front ferrule against outward radial deflection.

A principal object and primarily advantage of the invention is that it allows the use of lighter weight ferrules than was previously possible when engaging heavy weight tubing.

A further object of the invention is the provision of an arrangement for use in a phase controlled, sequential gripping tube fitting to eliminate undesired torsional rotation in the rear ferrule even when a relatively light weight ferrule is used.

Yet another object of the invention is the provision of a phase controlled sequential gripping tube fitting that is especially suited for heavy walled tubing but which can also be used for standard weight tubing.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 2:
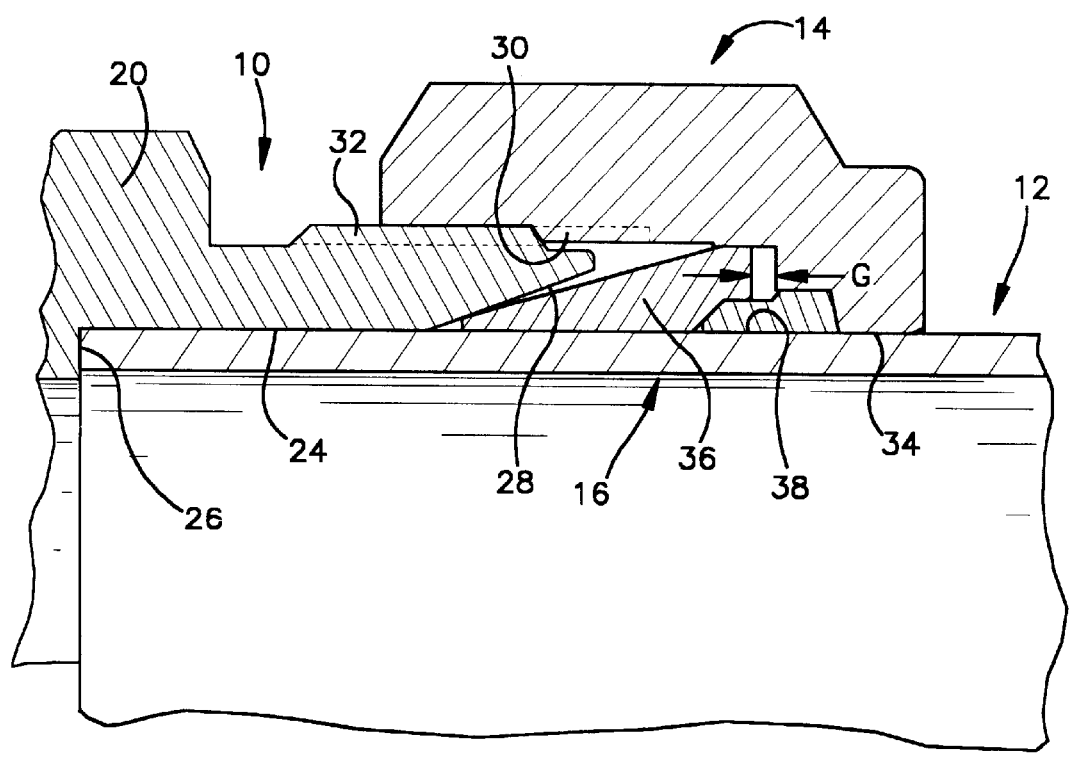
FIG. 2 is a view similar to FIG. 1 with a tube member inserted into the coupling and the coupling components made up to a finger-tight relationship.
Figure 3:
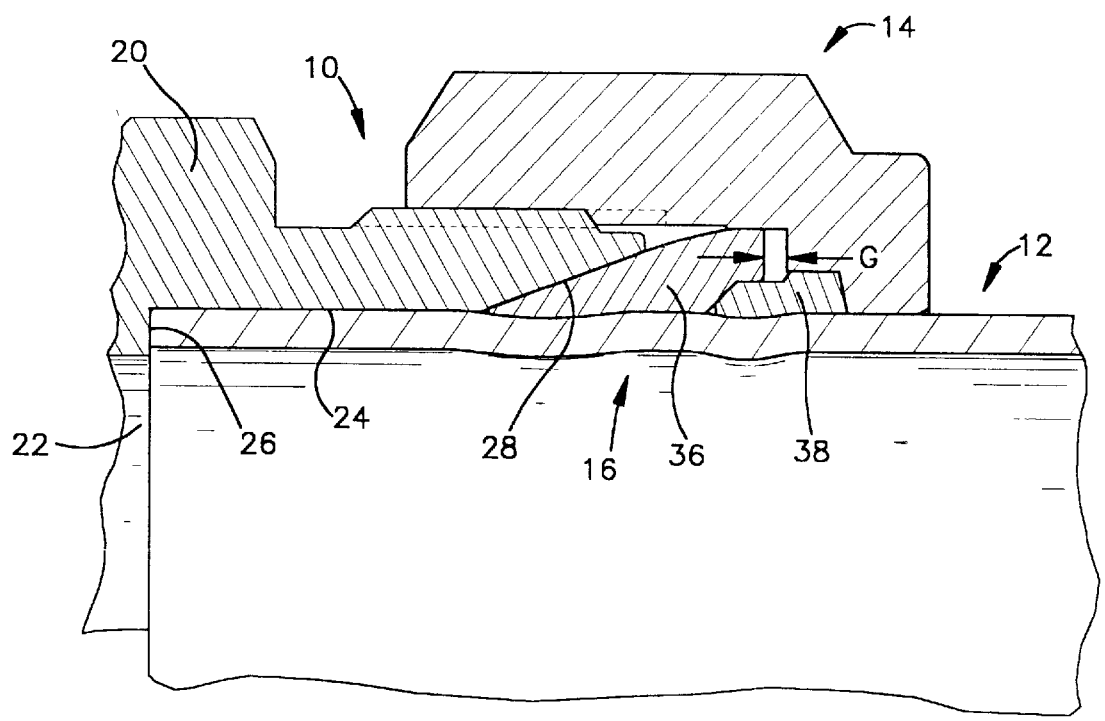
FIG. 3 is a view like FIG. 1 but showing the fitting in its made up condition with the ferrules in their tube gripping positions; and, FIG. 4 is a greatly enlarged view of the circled portion of FIG. 1.

Referring now to the drawings wherein the showings are for the purposes of illustrating the preferred embodiment of the invention only and not for purposes of limiting same, the FIGS. 2 and 3 generally show a coupling body 10 with a tubular member 12 associated therewith and received therein. Suitable gripping and sealing engagement between the body 10 and the tube member 12 is achieved through the use of a coupling nut 14 and a ferrule arrangement 16.

In the subject arrangement, the coupling body 10 has a first end 20 and an associated second end (not shown). It should be understood that the coupling body could be associated with any type of second end or associated structure and could be formed directly on a fluid flow device, such as a valve or the like. As can be appreciated, however, the coupling body 10 includes an internal flow passage 22 that joins with a cylindrical bore 24 extending axially inward of the first end 20. The bore 24 is preferably coaxial with the internal flow passage 22 and the juncture between bore 24 and flow passage 22 provides a radial end wall or shoulder 26. The diameter of counterbore 24 is, as can be seen from FIGS. 2 and 3, sized so as to closely but slidably receive the end of the tube 12. The shoulder 26 provides an inward limit stop for the tube 12 and locates the tube end relative to the ferrule arrangement 16. An outer counterbore 28 extends from counterbore 24 to the outer end of the fitting body and has a generally conical shape expanding radially outwardly to define a tapered, conical camming mouth about the bore 24.

Figure 1:
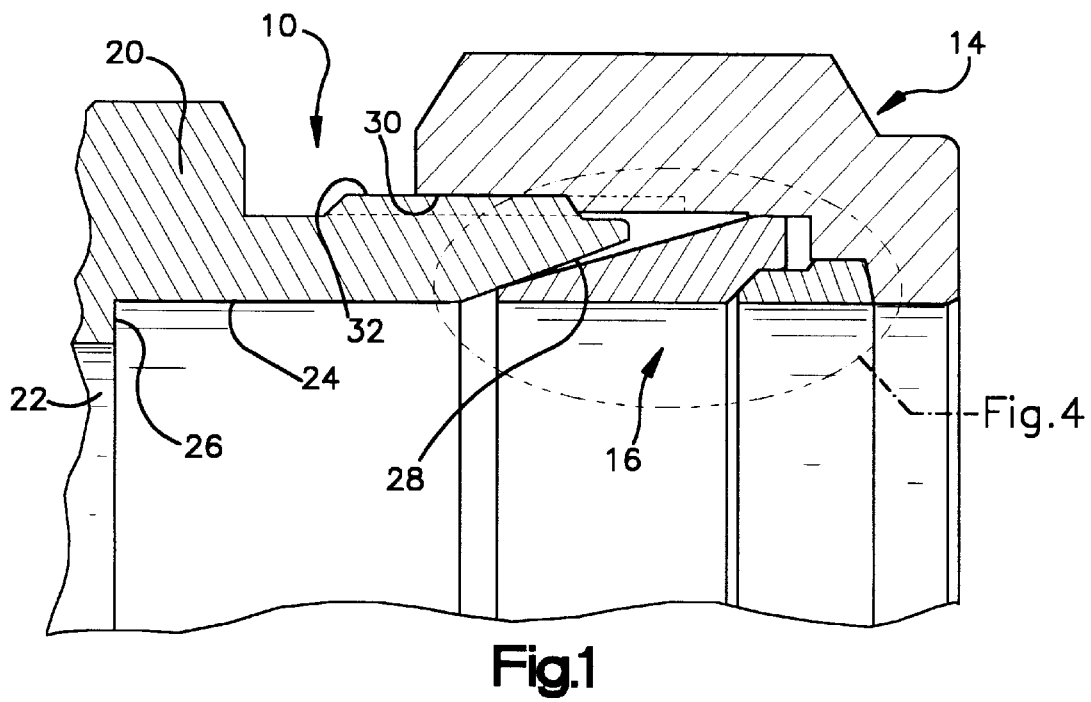
FIG. 1 is a partial side elevational view in cross section of a coupling device which employs a female coupling nut.
Figure 4:
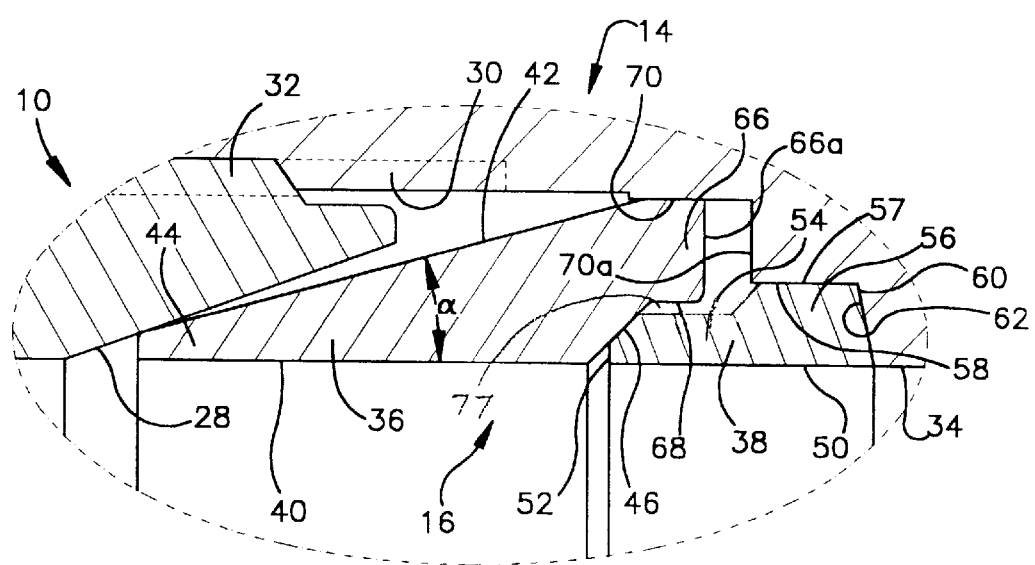

The coupling nut 14 is preferably of hex-shaped exterior configuration and has a central bore that is threaded as illustrated at 30 and cooperates with external threads 32 formed about the exterior of the body 10 on the first end 20. The coupling nut 14 acts to drive the ferrule arrangement 16 into its sealed and gripping relationship in a manner subsequently to be described. For the present, it should be noted that the axial outer end of the coupling nut 14 includes a central bore 34 that is sized so as to closely encircle the exterior of the tube 12. Referring in particular to FIGS. 1 and 4, the details and preferred construction for the ferrule arrangement 16 can best be understood. In particular, the assembly includes a front ferrule 36 and a rear ferrule 38. The front ferrule 36 has a central through opening 40 which is cylindrical in shape and sized so as to closely but slidably receive the tube 12. The exterior of the ferrule 36 is of tapered configuration as shown and tapers at an angle $\alpha$ only slightly less than the taper angle of the camming mouth 28. Preferably the angle $\alpha$ is in the range of about 10° to 30°. The corresponding angle of the camming mouth is generally slightly greater, as shown. The tapered outer surface 42 extends substantially the length of the ferrule from the nose 44 to adjacent the rear surface of the ferrule. The rear surface of the front ferrule 36 includes a conically tapered rear force receiving surface 46 that is inclined or tapered at an angle in the range of, for example, about 40° to 50° generally as shown.

Cooperating with the front ferrule is the second or rear ferrule 38 which has a central through opening 50 that generally corresponds in diameter to the central through opening 40 of the front ferrule 36. This opening 50 is also arranged so as to closely but slidably receive the tube 12. The forward or axial inner end 52 of the rear ferrule 38 is tapered so as to generally correspond to the taper of the force receiving recess 46 of the front ferrule. The rear ferrule 38 is preferably a unitary, annular ferrule, and does not have a split or a gap formed therein. Axially rearward of the inner or nose end 52 of ferrule 36 is a central body section 54 of cylindrical configuration. The axial outermost or right-hand end of the ferrule 38 is of slightly greater diameter as seen at 56 to define a radially extending end flange having a cylindrical radial outer side face 57. A counterbore 58 within the coupling nut 14 is sized and arranged so as to enclose the flange defined by portion 56 of ferrule 38. In addition, a slightly tapered or inclined end wall 60 on ferrule 38 is arranged to correspond with the angled inner shoulder 62 of the nut 14 and act as a force receiving surface when the nut 14 is tightened to body 10 to move the ferrules to their tube gripping and sealing position shown in FIG. 3.

Of particular importance to the invention is the relationship between the rear of the front ferrule and the forward, cylindrical body portion 54 of the rear ferrule 38. In particular, it will be seen that the front ferrule 36 includes an axially rearwardly extending cylindrical flange portion 66 that defines a cylindrical bore 68 leading to the force receiving inclined surface 46. This flange portion 66 preferably extends along a significant length of the rear ferrule, or the cylindrical body portion 54, to radially constrain the rear ferrule. The flange portion 66 may extend less than half along the cylindrical body portion. However, other lengths of the flange 66, such as greater than half the length of the cylindrical body portion, or about one fourth of the length of the rear ferrule 54, or other varying lengths, may still be utilized. The flange portion 66 preferably has a thickness sufficient to prevent buckling of the central body portion 54. Accordingly, the flange portion 66 is preferably thicker than the body portion 54 to prevent outward buckling of the central body portion, and in one embodiment the central body 54 is less than about two-thirds of the thickness of the flange portion 66. As can be seen in FIG. 4, the outer diameter of the flange portion of the front ferrule 36 is radially outward of the rear ferrule. Thus in the illustrated embodiment the front ferrule 36 has an outer diameter greater than the rear ferrule 34.

As best shown in FIG. 4, the flange portion 66 of the front ferrule 36 is radially spaced from the central body portion 54 of the rear ferrule 38. A ferrule gap 77 is located therebetween. The ferrule gap 77 helps to prevent frictional forces and stresses from building up between the flange portion and the central body portion during makeup of the fitting. This enables the ferrules to slide relatively smoothly during make-up. Although the nose 52 of the rear ferrule 38 engages the force receiving surface 46 of the front ferrule 36 during make up, the spacing between the ferrules at the ferrule gap 77 is preferably maintained during makeup. If there is buckling of the rear ferrule, the rear ferrule may distort slightly into the ferrule gap 77 before the flange portion 66 arrests the buckling of the rear ferrule. However, when there is no buckling, during normal make up the gap 77 is maintained. It should be noted that the width of the ferrule gap 77 in FIG. 4 is exaggerated for ease of illustration.

Additionally, it should be noted that there is within the nut member 14 a second counterbore 70 that is sized and arranged so as to closely enclose the rear end diameter of the front ferrule and constrain its radial outward movement during the tightening of the nut member 14 to the tube gripping position. In this way, both the front ferrule and the rear ferrule are radially constrained by the nut member while the nose portion of the rear ferrule is further constrained and guided by the counterbore 68 in the rear of the front ferrule 36. By so guiding and constraining the rear ferrule at both the axial inner and outer ends, it is caused to move progressively inward while it drives the front ferrule into its gripping position. This controlled movement prevents torsional twisting and constrains the gripping movement to avoid "bear clawing" or the over deflection or rolling of the nose portion of the rear ferrule. In addition, by so moving the force receiving surface of the front ferrule inwardly of the rear face, there appears to be a better ability of the rear ferrule to constrain and control the forces applied thereto.

FIG. 3 shows the components after the nut member 14 has been moved from the finger tight position of FIG. 2 to the "made-up," fully engaged tube gripping position. It is important to note that the length of central section 54 of rear ferrule 38 is related to the counterbore 58 of the coupling nut 14 and the cylindrical bore 68 so as to prevent any possibility of engagement between the end face 66a of flange portion 66 and end face 70a of second counterbore 70 (see FIG. 4). This assures that gap G is maintained at all times, even after makeup of the fitting as seen in FIG. 3. By maintaining the gap G, a spring action is retained by the ferrules. This assures a seal is maintained throughout thermal cycling and vibration. Also, it permits subsequent remake of the fitting. The gap G in the disclosed embodiment is located between the end face 66a of the front ferrule and the end face 70a of the coupling nut 14. However, the gap may be located between other elements, such as between the front ferrule and the rear ferrule, depending upon the particular arrangement and shapes of the components in the tube coupling. Although the components surrounding the gap may vary, it is preferable that the gap be sized and located so as to allow for deformation of the front ferrule 36 and rear ferrule 34. As the fitting is repeatedly made up, the front ferrule 36 and/or the rear ferrule 34 may plastically deform such that the front ferrule moves into the gap G. The rear ferrule may be compressed, or the front ferrule may acted upon such that the flange portion 66 is urged into the gap. The gap G provides an axially-extending space into which the ferrule may deform to allow repeated make ups of the fitting. There may be deformation of the ferrules after each make-up of the fitting, and the gap G accommodates the accumulated deformations. The gap preferably is large enough to accommodate significant deformation of the ferrule, and preferably extends axially a significant distance relative the central body portion 56 of the rear ferrule 38. In one embodiment, the gap extends about one-third the length of the central body portion 56.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A phase controlled sequential gripping tube fitting for gripping a tube therein, the fitting comprising:
   a rear ferrule shaped to receive said tube therein, the rear ferrule having a nose portion and a central body and a radial flange portion axially opposite said nose portion; said rear ferrule being circumferentially continuous along its axial length; and
   a front ferrule having an axially-extending substantially cylindrical rear portion radially outwardly spaced from said rear ferrule central body to form a radial gap between said rear portion and said central body; said radial gap being substantially maintained during and after a normal first-time make up of the fitting; said front ferrule rear portion having a rearward end face that at all times during a first-time make-up and during at least one subsequent make-up remains axially spaced from said rear ferrule flange portion.

2. The phase controlled sequential gripping tube fitting of claim 1 wherein said rear portion of said front ferrule extends along a significant length of said central body.

3. The phase controlled sequential gripping tube fitting of claim 1 wherein said front ferrule includes a tapered nose shaped to engage a camming mouth of a main body, and wherein said front ferrule further includes a force receiving surface located between said rear portion and said tapered nose.

4. The phase controlled sequential gripping tube fitting of claim 3 wherein said rear ferrule has a rear force receiving surface and wherein said nose portion is shaped to extend into said force receiving surface of said front ferrule, and wherein said central body is located between said rear force receiving surface and said nose portion.

5. The phase controlled sequential gripping tube fitting of claim 1 wherein said front ferrule has an outer diameter greater than the outer diameter of said rear ferrule.

6. The phase controlled sequential gripping tube of claim 1 wherein said axially-extending portion extends over at least one fourth of the length of said rear ferrule.

7. The phase controlled sequential gripping tube fitting of claim 1 wherein said axially-extending portion extends over less than half of said rear ferrule central body.

8. A phase controlled sequential gripping tube fitting for gripping a tube therein, the fitting comprising:
   a rear ferrule shaped to receive said tube therein, said rear ferrule having a substantially cylindrical central body; said rear ferrule being circumferentially continuous along its axial length;
   a front ferrule having an axially-extending substantially cylindrical rear portion having a rear face, said axially-extending portion being located radially outwardly of said rear ferrule central body to form a radial gap between said rear portion and said central body; said radial gap being substantially maintained during and after a normal first-time make up of the fitting; and
   an axial gap adjacent said rear face, said axial gap providing a space into which said front ferrule may be received as said front ferrule and said rear ferrule plastically deform with repeated make-ups of the fitting; said axial gap being substantially maintained during a normal first-time make-up and during at least one subsequent make up of the fitting.

9. In a phase controlled sequential gripping tube fitting including a main body having a cylindrical tube end receiving opening with a tapered camming mouth forming the entry to said opening, a front ferrule having a tapered forward nose surface in engagement in the camming mouth and a rear surface with a conically tapered recess extending forwardly toward the nose surface, a rear ferrule having a conically tapered nose extending into the conically tapered recess of the front ferrule and a rear force receiving surface, said rear ferrule being circumferentially continuous along its axial length; a coupling nut threadedly connected to the main body and having a force applying face engaged with the rear force receiving surface of the rear ferrule to drive the rear ferrule axially forward into the conically tapered rear surface of the front ferrule and produce radially inward movement of the nose portion of said rear ferrule, the improvement comprising:
   a cylindrical central body on the rear ferrule, the central body located between the nose portion and the rear force receiving surface, and a flange extending axially rearwardly from the front ferrule, the flange having a cylindrical interior surface that surrounds a portion of the cylindrical central body of the rear ferrule to form a radial gap between said cylindrical interior surface and said cylindrical central body; said radial gap being substantially maintained during and after a normal first-time make up of the fitting; said flange having an axial end face that is facing toward and axially spaced from the force applying face of the coupling nut to form an axial gap therebetween that is substantially maintained during a normal first-time make-up and during at least one subsequent make up of the fitting.

* * * * *